United States Patent [19]

Lippacher et al.

[11] 4,265,008

[45] May 5, 1981

[54] TOOL FOR PLACING SELF-DRILLING DOWELS

[75] Inventors: Wolfgang Lippacher, Breitbrunn; Gerhard Teger, Munich, both of Fed. Rep. of Germany

[73] Assignee: Hilti Aktiengesellschaft, Schaan, Liechtenstein

[21] Appl. No.: 97,855

[22] Filed: Nov. 27, 1979

[30] Foreign Application Priority Data

Nov. 30, 1978 [DE] Fed. Rep. of Germany ....... 2851896

[51] Int. Cl.³ .............................................. B23P 19/04
[52] U.S. Cl. ......................................... 29/240; 29/254
[58] Field of Search .................................. 29/254–255, 29/240, 234, 235; 81/52.3

[56] References Cited

U.S. PATENT DOCUMENTS 3,245,137  4/1966  Neuscholz et al. ................... 29/254

Primary Examiner—Robert C. Watson

Attorney, Agent, or Firm—Toren, McGeady and Stanger

[57] ABSTRACT

A tool engageable in a driving device is used for inserting and setting self-drilling dowels of the type consisting of a drill member and a spreader member. The tool is formed of an integral transmission member and plunger and an engaging member laterally encircling the plunger. The transmission member-plunger is axially displaceable relative to the engaging member. Percussive and rotative forces generated in the driving device are transferred into the transmission member-plunger. Projections are formed on the transmission member and engage surfaces on the engaging member for selectively transmitting one or both of the percussive and rotative forces to the drill member. Further, by axially displacing the transmission member-plunger relative to the engaging member, the spreader member can be driven into the drill member for setting or anchoring it within the borehole formed in the receiving material by the drill member.

14 Claims, 9 Drawing Figures

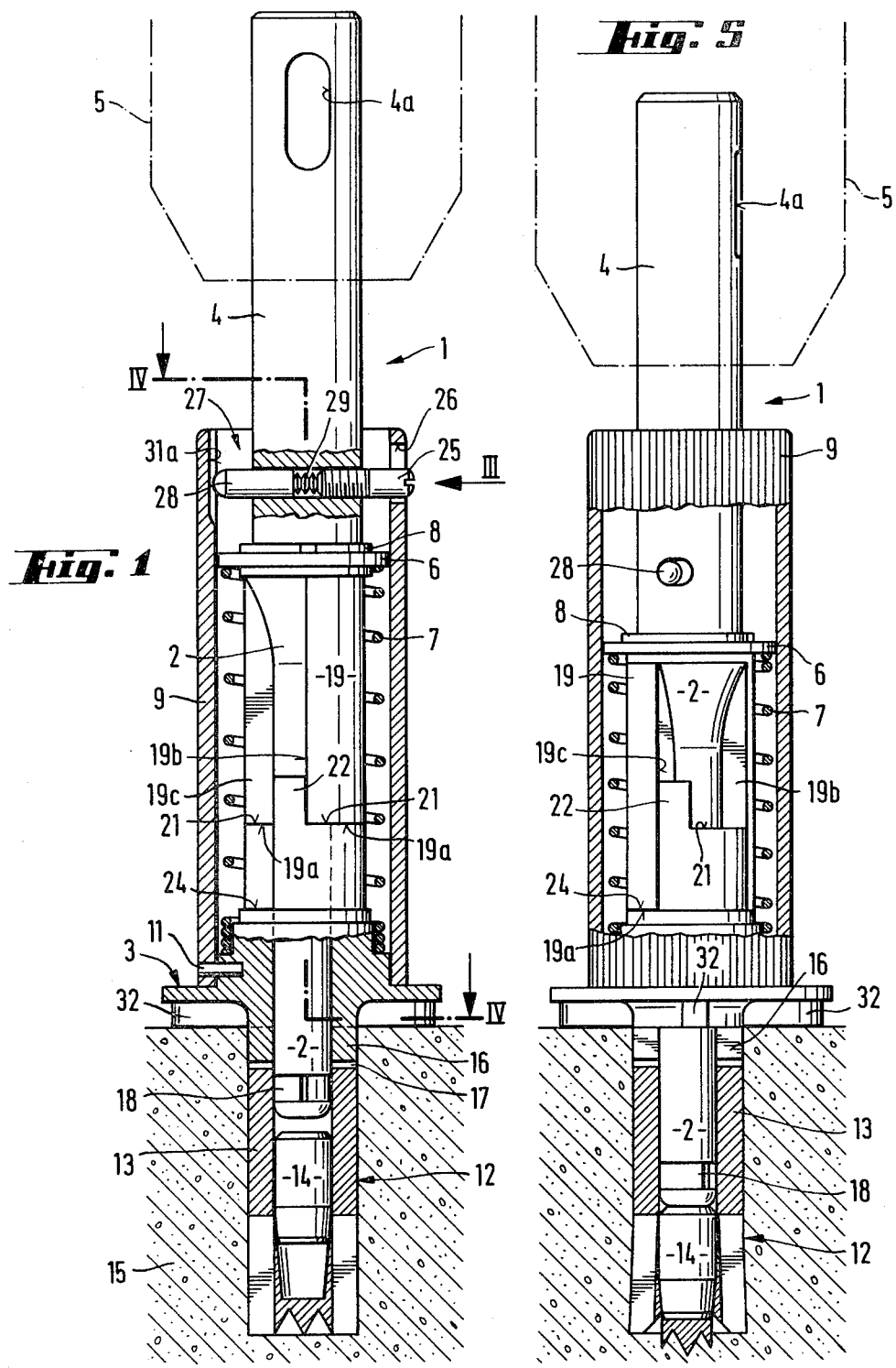

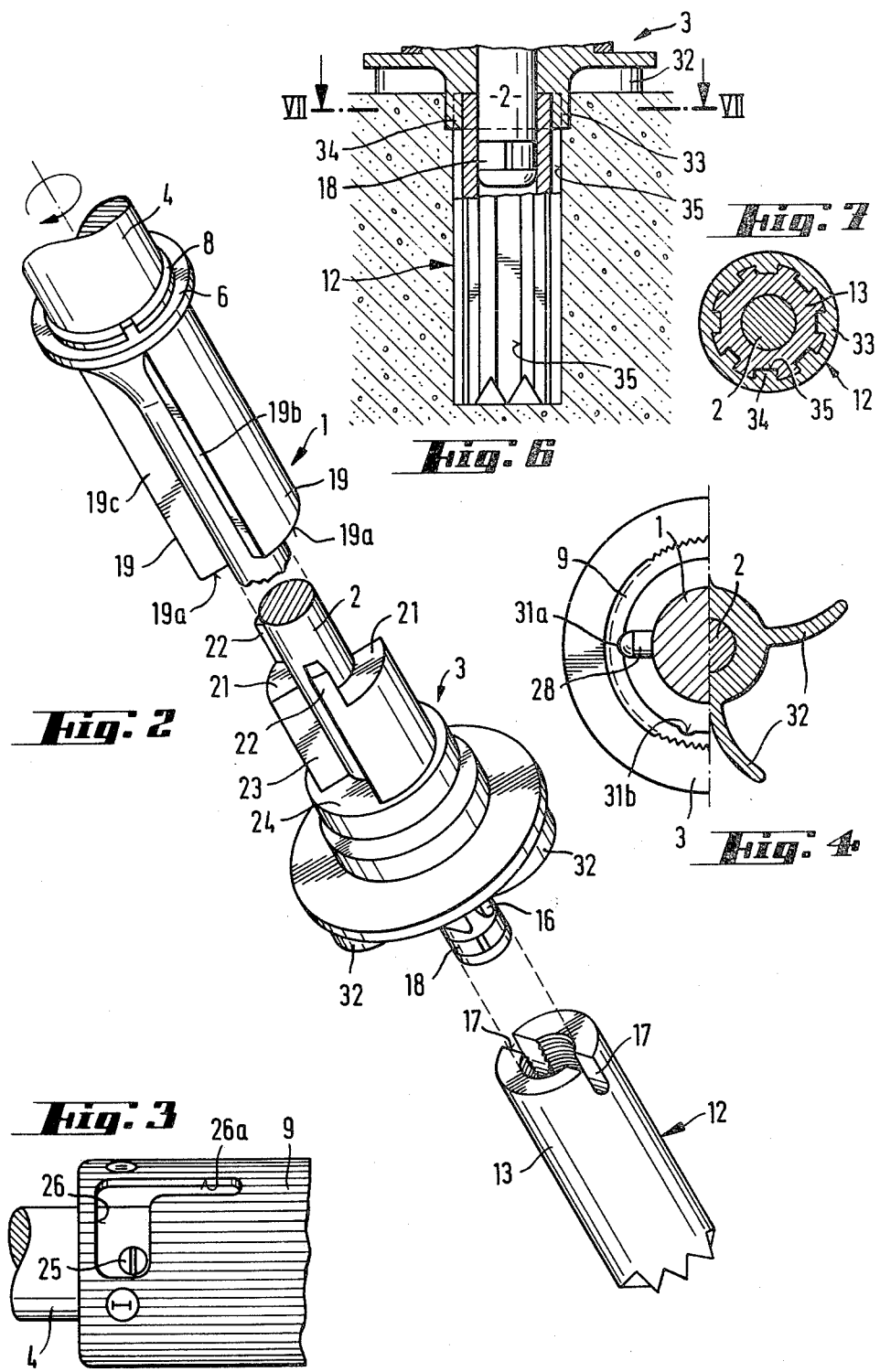

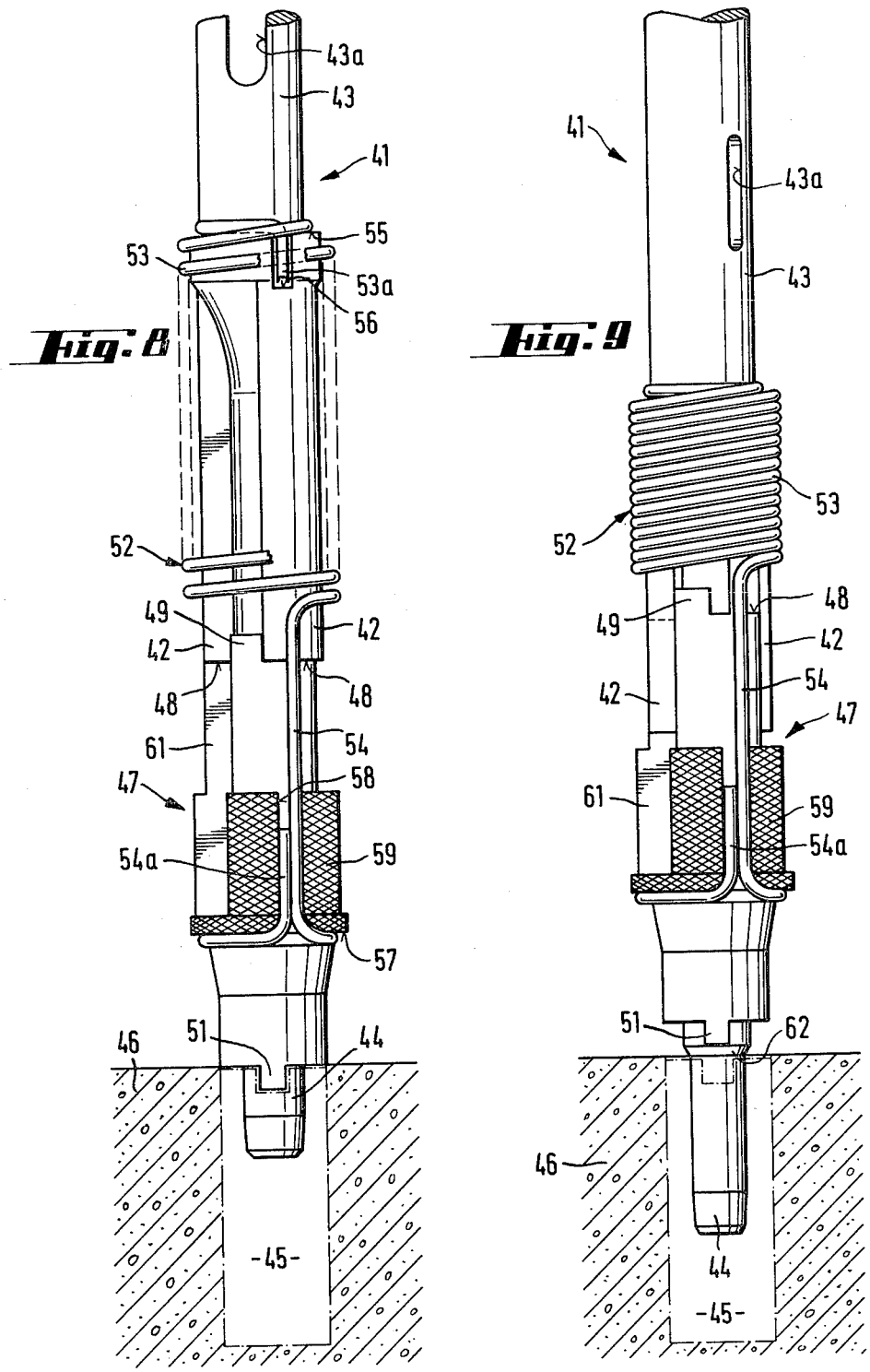

TOOL FOR PLACING SELF-DRILLING DOWELS

SUMMARY OF THE INVENTION

The present invention is directed to a tool for inserting and setting self-drilling dowels of the type consisting of a drill member and a spreader member. The tool includes an engaging member which applies percussive and rotative forces to the drill member, and a plunger which applies percussive force to the spreader member for driving the spreader member through the drill member for setting or anchoring it. In addition, the tool includes a transmission member having an insert shank for enagement within a driving device which generates the percussive and rotative forces. The transmission member transfers the percussive force to the engaging member and the plunger. The transfer of percussive force from the transmission member to the engaging member can be selectively supplied or discontinued by providing relative rotation between the engaging member and the transmission member.

In practice, tools are known which, on one hand, effect the drilling or inserting of the drill member and, on the other hand, the spreading of the drill member once it is inserted. With such tools, however, the insertion and setting operations are performed in two separate sequences. Accordingly, either two separate tools are used or adapter parts must be provided on the tools for effecting each sequence in the placing of the self-drilling dowel.

It can be appreciated that the manipulations involved in the placement of such a dowel are disadvantageous. Therefore, a tool has been used in the past which is capable of effecting the drilling step and the anchoring step of the dowel without requiring the exchange of adapter parts.

This known tool has a guide sleeve. In the forward portion of the guide sleeve a bolt-like engaging member for the drill member of the dowel is situated. In the rearward portion of the sleeve and separated from the engaging member, an essentially rod-like transmission member is axially movably guided by which a load can be applied to the engaging member. One end of the transmission member projects out of the guide sleeve in a direction opposite to which the dowel is inserted. The outer end portion has a percussion head with a conical outer surface so that the head can be inserted into a driving device which generates the percussive force.

While it is possible to transmit percussive force from the transmission member to the engaging member, it is also possible to impart manually a rotating action to the engaging member by means of a laterally projecting handle. The rotating movement is transmitted to the engaging member by a threaded pin which extends radially through the guide sleeve and is supported in a tangential flat surface on the engaging member.

After the drilling operation has been carried out, the spreader member of the dowel is driven in by a tubular plunger through which the engaging member extends. During the insertion of the drill member of the dowel into the receiving material, the transmission member applies percussive force to the engaging member, however, in inserting the spreader member the percussive force is transmitted to the tubular plunger through fingers which extend in the drilling direction over the intermediate arrangement of a percussive transmission sleeve. To shift the transmission of percussive force from the engaging member to the plunger, the transmission member must be rotationally offset. Accordingly, the transmission member must first be retracted over a relatively long axial path, since only in this manner is it possible to insert the fingers into longitudinal grooves in the guide sleeve which are used for a correct operation.

A significant disadvantage of this particular tool involves its many parts. The percussive force, for example, is transmitted to the plunger only indirectly and results in deformation of the parts to which high percussive force is applied. Such deformation of the parts results subsequently in operational difficulties. Further, such transmission of percussive force results in an undersired damping of the percussive action. Another significant disadvantage with respect to the manipulation and efficient insertion procedure is that it is only possible to supply the required rotative force by a manual operation.

Therefore, it is the primary object of the present invention to provide a tool for inserting and setting a self-drilling dowel of the type consisting of a drill member and a spreader member which affords problem-free handling and a simple design not susceptible to operational problems.

In accordance with the present invention, the transmission member is formed as a unit with the plunger and the transmission member includes on or several projections which transmit both percussive and rotative forces to the engaging member. The projections on the transmission member have surfaces which bear against the engaging member in both the radial and axial directions of the tool. Advantageously, the plunger in the form of a cylindrical bolt is constructed as a unit with the transmission member. In principle, it is possible to manufacture the transmission member and the plunger of different materials with the two parts being joined together by welding to form the unitary construction. The production of the transmission member and the plunger as a unit eliminates the problem of upsetting of parts which exists in known tools. Therefore, in accordance with the present invention, the tool does not experience any operating problems.

The handling of the tool is considerably simplified and a more efficient insertion and setting of the dowel is achieved because axially and radially extending surfaces on the transmission member contact the engaging member so that percussive force as well as rotative force can be supplied from the transmission member to the engaging member. Accordingly, the tool can be coupled to a driving device which provides both the percussive force and rotative force to the insert shank of the transmission member.

Preferably, the engaging member has support shoulders which correspond to certain surfaces on the projections of the transmission member. The shoulders extend in a plane normal to the longitudinal axis of the transmission member. Further, the engaging member is formed with axially extending recesses which correspond to the number of and cross sectional shape of the projections on the transmission member. The recesses in the engaging member extend parallel to the longitudinal axis of the transmission member.

The interaction of the projections on the transmission member with the support shoulders on the engaging member or of the projections on the transmission member in the recesses of the engaging member afford the option of effecting or preventing the transmission of percussive force to the engaging member. The operating positions are shifted in a simple manner by rotating the engaging member relative to the transmission member. In the operating position with the projections on the transmission member fitted into the recesses in the engaging member, a forward movement of the transmission member-plunger unit is possible so that the plunger can drive the spreader member forwardly into the drill member.

The projections can be formed in a simple manner, for example, as a pin which extends through and projects radially outwardly from the axially extending surfaces of the transmission member. To limit the specific forces acting on the projections and on the support shoulders of the engaging member, it is advantageous if the projections are formed as segments extending outwardly from the transmission member. Such projections can be provided by cutting appropriate channels or grooves in the axial direction in the axially extending surfaces of the transmission member.

Excessive spreading of the self-drilling dowel can be avoided by limiting the forward path of movement of the plunger. The limiting action can be achieved advantageously by limiting the axial depth of the recesses in the engaging member. After the dowel has been completely spread and anchored, the projections on the transmission member bear against the bottoms of the recesses in the engaging member so that a maximum anchoring value is achieved with certainty.

In the inserting and setting of self-drilling dowels in which the drill member is a cylindrical sleeve which is radially expanded by driving in a cylindrical or conical spreader member in the axial bore formed in the sleeve, it is advantageous if the engaging member is constructed as a concentric, essentaiily sleeve-like hollow member through which the shaft-like plunger of the transmission member-plunger unit can pass.

To rotate the drill member of the dowel, a form-locking engagement is provided by axially extending engaging cams on the forward end face of the engaging member. These engaging cams project into axially directed slots in the rearward end of the drill member so that a form-locking engagement for the transmission of rotative forces is effected. As a result, there is no complicated manipulation involved in placing the engaging member into the self-drilling dowel, rather a simple plug-in connection is afforded.

Another advantageous arrangement for transmitting rotation between the engaging member and the drill member is afforded by an annular extension on the forward end of the engaging member, that is, the end facing in the drilling direction, with the interior surface of the extension having a spline-like structure for engaging a similar spline-like structure on the outer surface of the drill member. The axial grooves provided by the spline-like structure on the outer surface of the drill member assure that high torques can be transmitted even when small diameter drill members are involved. Moreover, the axial grooves serve for the removal of drill chips.

Another feature of the present invention is the provision of radially extending wings or blades on the forward end face of the engaging member. These wings or blades remove drill chips from around the surface of the receiving material into which the drill member cuts a borehole. These blades have the important task of removing the drill chips from the surface of the workpiece during the final phase of the drilling operation. The removal of the chips assures the visibility of the location in the receiving material into which the borehole is drilled. Moreover, the blades can also serve as a stop for limiting the depth to which the drill member extends into the receiving material. Furthermore, a special concentric abutment shoulder can be provided on the forward end of the engaging member for the same purpose.

To prevent an accidental and undesired changeover in the position of the tool during operation, locking devices are provided which fix the position of the engaging member relative to the transmission member. The locking devices which may, for example, be resilient, can be arranged either directly between the engaging member and the transmission member or they may act indirectly on a member, such as a jacket tube, associated with the engaging member.

When a dowel is being inserted vertically downwardly into a receiving material, it has been found to be particularly advantageous if the forward end of the plunger facing in the drilling direction is provided with elements for holding the drill member of the dowel. The self-drilling dowel or, more particularly, the drill member can be slipped onto the forward end of the plunger projecting out of the engaging member prior to the commencement of the insertion operation so that the dowel is held in a force-locked manner by the holding element. A holding element in the form of a spring ring would be effective. With the self-drilling dowel secured on the front end of the tool, the tool can be guided against the surface of the receiving material so that it does not fall off.

Still another feature of the invention is the provision of the force accumulator between the transmission member and the engaging member. Advantageously, the force accumulator is in the form of a compression spring which drives the engaging member relative to the transmission member in the drilling direction. A significant advantage of the force accumulator occurs after the spreading step has been carried out and the tool has been removed from the inserted self-drilling dowel, in that the accumulator automatically shifts the engaging member relative to the transmission member so that a manual rotation of the engaging member is all that is required for shifting it into the striking position. Additionally, a compression spring can also serve to hold the transmission member and the engaging member together. In such an arrangement, the compression spring is axially fixed at its opposite end regions to each of the parts which are to be held together.

When the tool is used with a driving device whose rotary drive cannot be switched off, it is advantageous if the force in the accumulator is arranged between the engaging member and the transmission member, for example, in the form of a tension spring, which drives the engaging member relative to the transmission member against the drilling direction. The tension spring causes the transmission member-plunger unit to move forwardly relative to the engaging member when the transmission member has been rotated into the position in which its projections are aligned with the recesses in the engaging member. Following the drilling step, the spreader member can be driven in by the forwardly displaced plunger without the engaging member being in engagement with the drill member. Additionally, the axial extent of the spreading path can be precisely defined by locating a collar or shoulder on the plunger.

Preferably, a rotating member is located between the engaging member and the transition member so that it rotates the engaging member into the position in which the percussive force is transmitted to the engaging member. This arrangement results in a further simplification of the handling of the tool, especially when the force accumulator is constructed as a tension spring. After the dowel has been anchored, the engaging member is moved forwardly in the drilling direction relative to the transmission member against the force of the tension spring and after this shifting action has been completed, the rotating member automatically rotates the engaging member and the transmission member into the position required for the commencement of the next dowel insertion. For a simple design, the rotating member is advantageously constructed as a torsion arm which extends in the drilling direction and forms the forward end part of the tension spring.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is an axially extending view, partly in section, of a tool embodying the present invention and illustrated in the drilling position;

FIG. 2 is perspective view of the parts of the tool shown in FIG. 1 with portions of the parts broken away and with the self-drilling dowel spaced forwardly from the end of the tool;

FIG. 3 is a detail view of the portion of the tool indicated by the arrow III in FIG. 1;

FIG. 4 is a view partly in section taken along the line IV—IV in FIG. 1;

FIG. 5 is a view similar to FIG. 1, however, showing the tool in the position spreading the self-drilling dowel;

FIG. 6 is a elevational view, partly in section, showing another embodiment of the connection of the engaging member of the tool with the drill member of the dowel so that rotative force can be transmitted to the drill member;

FIG. 7 is a cross sectional view taken along the line VII—VII in FIG. 6;

FIG. 8 is an elevational view of another embodiment of a tool for inserting and setting self-drilling dowels with the tool illustrated in the drilling position; and FIG. 9 is an elevational view of the tool shown in FIG. 8 with the tool illustrated in position for setting the self-drilling dowel.

DETAIL DESCRIPTION OF THE INVENTION

In FIG. 1 a tool is illustrated for inserting and setting a self-drilling dowel 12 into a receiving material 15. The tool rotates the self-drilling dowel so that it can drill a borehole into the receiving material. Subsequently, with the self-drilling dowel fully inserted, the tool spreads the dowel and anchors it in the receiving material. As viewed in FIGS. 1 and 2 the lower end of the tool and of the self-drilling dowel 12 is the leading end and the upper end is the trailing end.

The tool includes an axially elongated transmission member 1. At its leading end, that is the lower end as viewed in FIG. 1, the transmission member 1 is integrally connnected to an axially elongated shaft-like plunger 2 so that the transmission member and the plunger form a unit. Plunger 2 extends through a sleeve-like engaging member 3. The trailing end portion of transmission member 1 is formed by an axially elongated insert shank 4 which can be inserted into the chuck of a driving device 5 which is only illustrated schematically by dot and dash lines. The driving device 5 is capable of generating both percussive and rotative forces. Grooves or channels 4a in the insert shank 4 serve to interengage with coupling members in the driving device 5 so that the percussive and rotative forces can be transmitted from the device into the transmission member 1.

Engaging member 3 is arranged to be axially movable relative to the transmission member 1. A compression spring 7 is supported at its leading end on an annular shoulder facing in the trailing direction while the trailing end of the spring bears against a support disc 6 mounted on the transmission member 1. The spring applies an axially directed force against the engaging member in the drilling direction into the receiving material 15. A locking ring 8 is located on the trailing end side of the support disc 6 and secures to it in position on the transmission member 1. An axially extending jacket tube 9 laterally encloses the trailing end portion of the engaging member and is fixed to it by means of a radially extending pin 11. From the engaging member 3, the jacket tube 9 extends in the trailing direction to a point beyond the support disc 6 so that the support disc maintains the tube 9 concentric to the transmission member 1. Jacket tube 9 serves as protection for the operator and also as a protective enclosure around the transmission member 1. Moreover, the jacket tube functions as a handle in shifting between the operating positions of the tool. The outer surface of the jacket tube 9 is knurled or striated so that it can be securely gripped.

As illustrated in FIG. 1, the self-drilling dowel 12 consists of a sleeve-like drill member 13 and a spreader member 14 positioned in the bore in the drill member. The percussive and rotative forces transmitted to the self-drilling dowel 12 cause the drill member 13 to drill into the receiving material 15, such as concrete, thereby forming a borehole. Percussive force is transmitted from the transmission member 1 to the engaging member 3 and then to the trailing end face of the drill member 13. The rotative force is also transmitted from the transmission member 1 to the engaging member 3 which has two diametrically opposite axially extending engaging cams 16 which project into axially extending slots 17 formed in the trailing end of the drill member. The leading end of the plunger 2 which projects into the trailing end of the drill member 13 is provided with a holding element 18 in the form of a spring ring affording frictional engagement with the surface of the bore within the drill member. This frictional engagement secures the self-drilling dowel 12 on the leading end of the tool and prevents the dowel from falling off as it is moved downwardly into position for drilling the borehole into the receiving material 15.

The transmission of the percussive and rotative forces will now be explained in more detail with the aid of FIGS. 2, 3 and 4. In FIG. 2 the transmission member 1-plunger 2 unit is illustrated with the plunger extending axially through and forwardly or in the leading or drilling direction beyond the engaging member 3 so that it can centrally engage the drill member 13 of the self-drilling dowel 12. Further, the engaging cams 16 are shown aligned with the slots 17 and during the drilling operation the cams fit in form-locking engagement within the slots.

Two diametrically opposed projections 19 extend in the axial direction along the transmission member 1. In cross section, the projections 19 have a segment-like appearance and are formed by cutting grooves or recesses in the circumferential surface of the transmission member. For a better illustration, in FIG. 1 the engaging member 3 is moved in the drilling direction toward the leading end of the tool relative to the transmission member 1 beyond a position which is required for normal operation, so that support shoulders 21 can be seen on the engaging member 3. The support shoulders 21 are located in a plane extending perpendicularly to the axis of the transmission member. Axially extending projections 22 are located at one end of each support shoulder and extend in the axial direction of the transmission member toward its trailing end. As can be seen in FIG. 2, the support shoulders 21 are spaced apart so that an axially extending recess is formed in the engaging member 3 extending from the support shoulders 21 toward the leading end of the tool and terminating in a bottom part 24 which extends transversely of the axial direction of the transmission member 1. Each projection 19 has a leading end face 19a and the leading face has a surface area and shape corresponding essentially to that of the support shoulders 21. In addition, the segment-like projections 19 have axially extending sides 19b and the width of the sides 19b corresponds approximately to the radial dimension of the projections 22. At the trailing end of the transmission member 1 in FIG. 2, an arrow indicates the direction of rotation of the transmission member in transmitting rotative force. Accordingly, the side 19b of each projection is its leading side in the direction of rotation. Each projection has a trailing side 19c also extending in the axial direction. The sides 19b on one projection and 19c on the other projection define an axially extending recess between the projections.

During the drilling operation, as illustrated in FIG. 1, the transmission member 1 is pressed against the engaging member 3 with the ends 19a of the projections 19 in contact with the support shoulders 21 on the engaging member for effecting the transmission of percussive force. Further, the arrow at the trailing end of the transmission member indicates its direction of rotation so that at the same time the driving device 5 transmits rotative force to the transmission member 1 and this rotative force is transferred by the contact of the leading end of the axially extending side 19b with the projection 22 on the engaging member so that the rotative force supplied by the driving device to the transmission member is transmitted through the engaging member to the self-drilling dowel 12.

As can be seen in FIGS. 1 and 3, the operating position of the tool is indicated by a shifting symbol provided by an indicating pin 25 which is threaded into the transmission member 1 and extends radially outwardly through the jacket tube 9 in the region of the L-shaped slot 26. The operating position of the tool is fixed by a locking arrangement 27. The locking arrangement 27 includes a pin 28 which is movably supported within the transmission member 1 in alignment with the indicating pin 25. The pin 28 is pressed by cup spring 29 into an axially extending groove 31a formed in the inner surface of the jacket tube 9 at the trailing end of the tube. The position of the pin 28 and the groove 31a can also be noted in FIG. 4. In addition, through the interaction of the trailing edge of the slot 26 with the pin 28, the movement of the jacket tube 9 or of the engaging member 3 relative to the transmission member 1 is limited.

During the drilling operation, the engaging member 3 is guided toward the surface of the receiving material 15 as the self-drilling dowel 12 drills into the receiving material. Drill chips carried to the surface of the receiving material 15 during the drilling of the borehole by the drill member 13 collect on the surface when the drilling direction is vertically downward. These drill chips are removed from the entrance to the borehole during the final phase of the drilling operation by blades 32 located on the face of the engaging member 3 directed toward the receiving material. As a result, the location at which the dowel enters the receiving material is visible. Moreover, when the blades 32 finally contact the surface of the receiving material 15, the movement of the drill member 13 in the leading direction is automatically limited.

As the completion of the drilling operation, as is illustrated in FIG. 1, the rotational movement in the driving device 5 is turned off and the jacket tube 9 is rotated relative to the transmission member 1 into the other operating position where the trailing sides 19c of the projections come into contact with sides of the projections 22. During this relative rotation, pin 28 is displaced out of the longitudinal or axial groove 31a and engages the second axial groove 31b, note FIG. 4. In this rotated position, the ends 19a of the projections 19 are aligned with the recesses 23 in the engaging member 3. By applying force in the drilling or leading direction on the driving device 5, the transmission member 1 is moved against the biasing action of the compression spring 7 toward the engaging member 3 so that the plunger 2 extends into the bore in the drill member 13 into contact with the spreader member 14 for applying percussive force and anchoring the drill member in the borehole formed in the receiving material 15. During the movement of the transmission member in the leading direction, pin 25 moves along the axially extending section 26a of the slot 26, note FIG. 3. This operating position of the tool is shown in FIG. 5. Movement of the transmission member 1-plunger 2 unit is limited by the contact of the ends 19a of the projections 19 against the bottom part or surface 24 of the engaging member.

After the dowel 12 has been anchored in the receiving material 15, the tool is removed from the dowel with the result that the compression spring 7 shifts the engaging member relative to the transmission member in the drilling or leading direction so that the ends 19a of the projections 19 and the support shoulders 21 on the engaging member 3 are once again in a common plane. Accordingly, by a relative rotation of the engaging member 3 and the transmission member 1, the drilling position as illustrated in FIG. 1 is once again reached.

In FIG. 6, the engaging member 3, as in FIG. 1, is provided with an extension 33 in the leading direction. This extension 33 is annular and its interior surface is splined providing alternating radially directed lands 34 and grooves of rectangular cross section. Similarly, the exterior surface of the drill member 13 is splined forming a plurality of axially extending grooves 35 so that the lands 34 fit into the grooves 35, note FIG. 7. This interengagement between the engaging member 3 and the dowel 12 assures adequate transmission of rotative forces to the dowel.

In FIGS. 8 and 9 another embodiment of the tool is illustrated in a simplified manner, for example, certain details, such as the blades and the like, are not illustrated.

In FIG. 8, the tool is shown in the drilling position and consists of the transmission member 41 with axially extending projections 42 similar to the projections on the tool illustrated in FIG. 1. At its trailing end, the transmission member 41 has an insert shank 43 provided with grooves 43a for coupling engagement with a driving device for transmitting rotative force from the device to the transmission member. Plunger 44 is integrally formed with the transmission member 41 and projects in the leading direction axially from the transmission member. As displayed in FIG. 8, the leading end of the plunger 44 projects into a schematically illustrated self-drilling dowel 45. The dowel has been drilled into the receiving material 46. The plunger 44 extends through engaging member 47 and is provided at its trailing end with support shoulders 48 for contact with the projection 42 for transferring percussive forces and for contact with the projections 49 extending in the trailing direction on the engaging member for transmitting rotative force. The rotative force is transmitted from the engaging member 47 via engaging cams 51 to the self-drilling dowel 45.

The engaging member 47 is movably supported relative to the transmission member 41 and is held in the axial direction by a spring 52 with the support shoulders 48 in contact with the transverse ends of the projections 42 and with the axially extending sides of the projections 42 in contact with the projections 49. The spring 52 is formed of a tension spring 53 in its trailing portion and of a torsion spring 54 in its leading portion. At its trailing end, the spring 52 is axially supported by a collar 55 on the transmission member 41 and is fixed against rotation by its bent end 53a engaged in a recess 56 in the transmission member 41. At its leading end, the spring 52 is axially supported by an abutment 57 on the engaging member 47 and its bent end 54a is fixed against rotation in a groove 58.

When the drilling operation is concluded, as illustrated in FIG. 8, after the driving device is switched off, the engaging member 47 is rotated against the biasing force of the torsion spring 54 relative to the transmission member 41 by applying a turning force at knurled zone 59. The turning force is exerted in the direction of rotation in the drilling operation. As a result, the projections 42, as is the case with the tool illustrated in FIG. 1, come to rest in alignment with the recesses 61 formed in the engaging member 47. The tension spring effects an axial movement in the trailing direction of the engaging member 47 relative to the transmission member 41. Accordingly, the plunger is moved in the leading direction out of the engaging member in the axial direction of the tool. When the driving device is again switched on, plunger 44 can be driven through the bore in the self-drilling dowel to provide the anchoring action until an abutment shoulder 62 on the plunger 44 prevents any further axial movement into the self-drilling dowel, as can be seen in FIG. 9.

After the conclusion of the spreading or anchoring operation, the engaging member is moved against the action of the spring 52 into the initial position shown in FIG. 8. It can be appreciated from the description of the operation, that the spring 52 also has a locking function with regard to the different operating positions of the tool, so that no special locking arrangements are needed.

While specific embodiments of the invention have been shown and described in detail to illustrate the application of the inventive principles, it will be understood that the invention may be embodied otherwise without departing from such principles.

What is claimed is:

1. Tool for inserting and setting a self-drilling dowel, consisting of a drill member and a spreading member, in a receiving material, comprising an engaging member arranged to engage and apply percussive and rotative forces to the drill member for inserting the drill member into the receiving material, a plunger for applying percussive force to the spreader member for driving the spreader member relative to the drill member for setting the drill member within the receiving material, said plunger being movable relative to said engaging member in the direction of insertion of the dowel for effecting the setting of the dowel, a transmission member including an insert shank which is engageable within a driving device, said transmission member arranged to transmit percussive force from the driving device to said engaging member and plunger and to selectively transmit rotative forces to said engaging member and plunger at the same time that percussive forces are transmitted, wherein the improvement comprises that said transmission member and plunger are formed as an axially extending unit with said transmission member having a first end formed by said insert shank adapted to be inserted into a driving device and a second end from which said plunger extends axially, said transmission member having an axially extending surface extending between the first and second ends thereof, said transmission member having at least one axially extending projection projecting radially outwardly therefrom, said projection having a first axially extending side, a second axially extending side, and a radially extending end, and said first axially extending side and said radially extending end being engageable with said engaging member for effecting the transmission of percussive and rotative forces.

2. Tool, as set forth in claim 1, wherein said engaging member has at least one support shoulder thereon with the number of said support shoulders corresponding to the number of said projections on said transmission member, said support shoulders extending transversely of the axial direction of said transmission member and the shape and area of each said support shoulder corresponding to the general shape and area of said radially extending end of said projection, and said engaging member having at least one recess extending in the axial direction of said transmission member and the number of said recesses corresponding to the number of said projections on said transmission member and the shape of each said recess transversely of the axial direction of said transmission member corresponding to the shape of said projection in a plane extending transversely of the axial direction of said transmission member so that each said projection can be received into a corresponding said recess.

3. Tool, as set forth in claim 1, wherein said projections on said transmission member have a segment-like shape in a plane extending transversely through the axis of said transmission member.

4. Tool, as set forth in claim 2, wherein said at least one recess in said engaging member has a bottom surface extending transversely of the axial direction of said transmission member and being located at the end of said recess more remote from said insert shank.

5. Tool, as set forth in claim 1, wherein said engaging member is a sleeve-like hollow member having a central opening therethrough, and said plunger being axially displaceable through the opening in said engaging member.

6. Tool, as set forth in claim 1, wherein said engaging member having cams extending in the axial direction of said transmitting member and extending from said engaging member on the end thereof more remote from said insert shank for effecting a form-locking engagement with the drill member for transmitting rotative force to the drill member.

7. Tool, as set forth in claim 1, wherein the ends of said engaging member more remote from said insert shank has an annular extension with the inner surface of said annular extension being splined for effecting a form-locking engagement with a similarly splined surface on the drill member for transmitting rotative force from said engaging member to the drill member.

8. Tool, as set forth in claim 1, wherein said engaging member has an annular surface extending transversely of the axial direction of said transmission member and encircling the axis of said transmission member, a plurality of radially extending angularly spaced blades located on said surface for effecting the removal of drill chips as said engaging member approaches the surface of the receiving material into which the drill member is inserted.

9. Tool, as set forth in claim 1, including means for releasably locking said engaging member relative to said transmission member in at least two positions spaced angularly apart around the axis of said transmission member.

10. Tool, as set forth in claim 1, wherein holding means being provided in the end of said plunger more remote from said transmission member for effecting a holding action on the drill member for retaining the drill member on the tool.

11. Tool, as set forth in claim 1, wherein a force accumulator is arranged between and in contact with said engaging member and said transmission member for displacing said engaging member in the axial direction of said transmission member away from said insert shank.

12. Tool, as set forth in claim 1, wherein a force accumulator is located between and in contact with said engaging member and said transmission member for displacing said engaging member in the axial direction relative to said transmission member in the direction toward said insert shank.

13. Tool, as set forth in claim 12, wherein said force accumulator includes a member for rotating said engaging member around the axis of said transmission member for displacing said engaging member into the position for transmitting percussive force from said transmission member to said engaging member.

14. Tool, as set forth in claim 9, wherein said locking means comprise a sleeve-like tubular member laterally enclosing at one end thereof a portion of the axial length of said engaging member and extending therefrom toward said insert shank with said tubular member laterally enclosing an axially extending part of said transmission member, and pin means extending through said transmission member and releasably secured in said tubular member for securing the angularly spaced positions of said engaging member relative to said transmission member in the different operating positions of the tool.

* * * * *